US011906922B2

(12) United States Patent
Yamada et al.

(10) Patent No.: US 11,906,922 B2
(45) Date of Patent: Feb. 20, 2024

(54) SORTING DEVICE AND IMAGE FORMING APPARATUS THEREWITH

(71) Applicant: KYOCERA Document Solutions Inc., Osaka (JP)

(72) Inventors: Tomoyasu Yamada, Osaka (JP); Hirofumi Tsuji, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 59 days.

(21) Appl. No.: 17/390,067

(22) Filed: Jul. 30, 2021

(65) Prior Publication Data

US 2022/0043384 A1 Feb. 10, 2022

(30) Foreign Application Priority Data

Aug. 4, 2020 (JP) ................................ 2020-132184

(51) Int. Cl.
*B65H 31/24* (2006.01)
*G03G 15/00* (2006.01)

(52) U.S. Cl.
CPC ......... *G03G 15/6538* (2013.01); *B65H 31/24* (2013.01)

(58) Field of Classification Search
CPC .................... B65H 31/24; B65H 33/08; B65H 2405/1412; B65H 2601/325; B65H 2405/141; G03G 15/6538
See application file for complete search history.

(56) References Cited

U.S. PATENT DOCUMENTS

| | | | | | |
|---|---|---|---|---|---|
| 9,409,739 | B2 * | 8/2016 | Dinnissen | B65H 31/20 | |
| 2002/0158405 | A1 * | 10/2002 | Nagasako | B65H 31/10 | 271/220 |
| 2003/0222392 | A1 * | 12/2003 | Matsuyama | B65H 31/30 | 271/1 |
| 2007/0040887 | A1 * | 2/2007 | Miyashita | B65H 31/02 | 347/104 |
| 2009/0169281 | A1 * | 7/2009 | Oyama | G03G 15/6552 | 399/405 |
| 2019/0092055 | A1 * | 3/2019 | Lee | B65H 3/063 | |
| 2019/0366746 | A1 * | 12/2019 | Emoto | B65H 43/00 | |

FOREIGN PATENT DOCUMENTS

JP 2002-338122 A 11/2002

* cited by examiner

*Primary Examiner* — Jennifer Bahls
(74) *Attorney, Agent, or Firm* — Stein IP, LLC

(57) ABSTRACT

A sorting device includes a base portion and a tray portion. The tray portion is supported on the base portion to be reciprocatable between a first shift position, where the tray portion is located at one side in the sheet width direction, and a second shift position, where the tray portion is located at the other side in the sheet width direction. The tray portion has a cutout portion. The cutout portion is formed by cutting away, with a predetermined width, an end part of the tray portion in the sheet width direction inward across the tray portion. With the tray portion at the second shift position, the cutout portion is located below one side end edge of the sheet in the sheet width direction, of sheets stacked on the tray portion.

6 Claims, 6 Drawing Sheets

SORTING DEVICE AND IMAGE FORMING APPARATUS THEREWITH

INCORPORATION BY REFERENCE

This application is based on and claims the benefit of Japanese Patent Application No. 2020-132184 filed on Aug. 4, 2020, the contents of which are hereby incorporated by reference.

BACKGROUND

The present disclosure relates to a sorting device that is provided in an in-body discharge space in an image forming apparatus to sort sheets discharged from the image forming apparatus in the sheet width direction orthogonal to the sheet discharge direction. The present disclosure also relates to an image forming apparatus that incorporates such a sorting device.

There are known trays that are provided in an in-body discharge space in an image forming apparatus and on which sheets discharged from the image forming apparatus are stacked. A user retrieves the sheets stacked on the tray from one side in the sheet width direction orthogonal to the sheet discharge direction, that is, from the front side of the in-body discharge space. To permit the user easy retrieval of sheets, a cutout portion is provided in one end part of the tray in the sheet width direction. The cutout portion is formed by cutting away an end part of the tray from one side in the sheet width direction inward in the sheet width direction. The cutout portion is provided at such a position as to overlap the sheets stacked on the tray. The user can put a hand into the cutout portion and grab a bundle of sheets on the tray by holding it from opposite sides in the up-down direction.

Also known are sorting devices that are provided in an in-body discharge space in an image forming apparatus and that sort sheets discharged from the image forming apparatus in the sheet width direction orthogonal to the sheet discharge direction. Such a sorting device includes a base portion provided in a bottom portion of the in-body discharge space and a tray portion provided so as to be reciprocatable in the sheet width direction with respect to the base portion. The sheets discharged from the image forming apparatus are stacked on the tray portion. While the sheets are discharged, the sorting device moves the tray portion in the sheet width direction to displace the stacking position of the sheets, and thereby sorts the sheets.

SUMMARY

According to one aspect of the present disclosure, a sorting device is provided in a sheet discharge space in an apparatus body, and shifts the stacking position of discharged sheets in the sheet width direction orthogonal to the sheet discharge direction, thereby to sort the sheets. The sorting device includes a base portion and a tray portion. The base portion is attached to a bottom portion of the sheet discharge space in the apparatus body. The tray portion is supported on the base portion so as to be reciprocatable between a first shift position, in which the tray portion is located at one side in the sheet width direction, and a second shift position, in which the tray portion is located at an other side in the sheet width direction. On the tray portion, the sheets discharged from the apparatus body are stacked. The sheets on the tray portion can be retrieved from one side in the sheet width direction. The tray portion has a cutout portion. The cutout portion is formed by cutting away, with a predetermined width, an end part of the tray portion at one side in the sheet width direction inward across the tray portion. When the tray portion is in the second shift position, the cutout portion is located under the end edge, at one side in the sheet width direction, of the sheets stacked on the tray portion.

DETAILED DESCRIPTION

Figure 1:
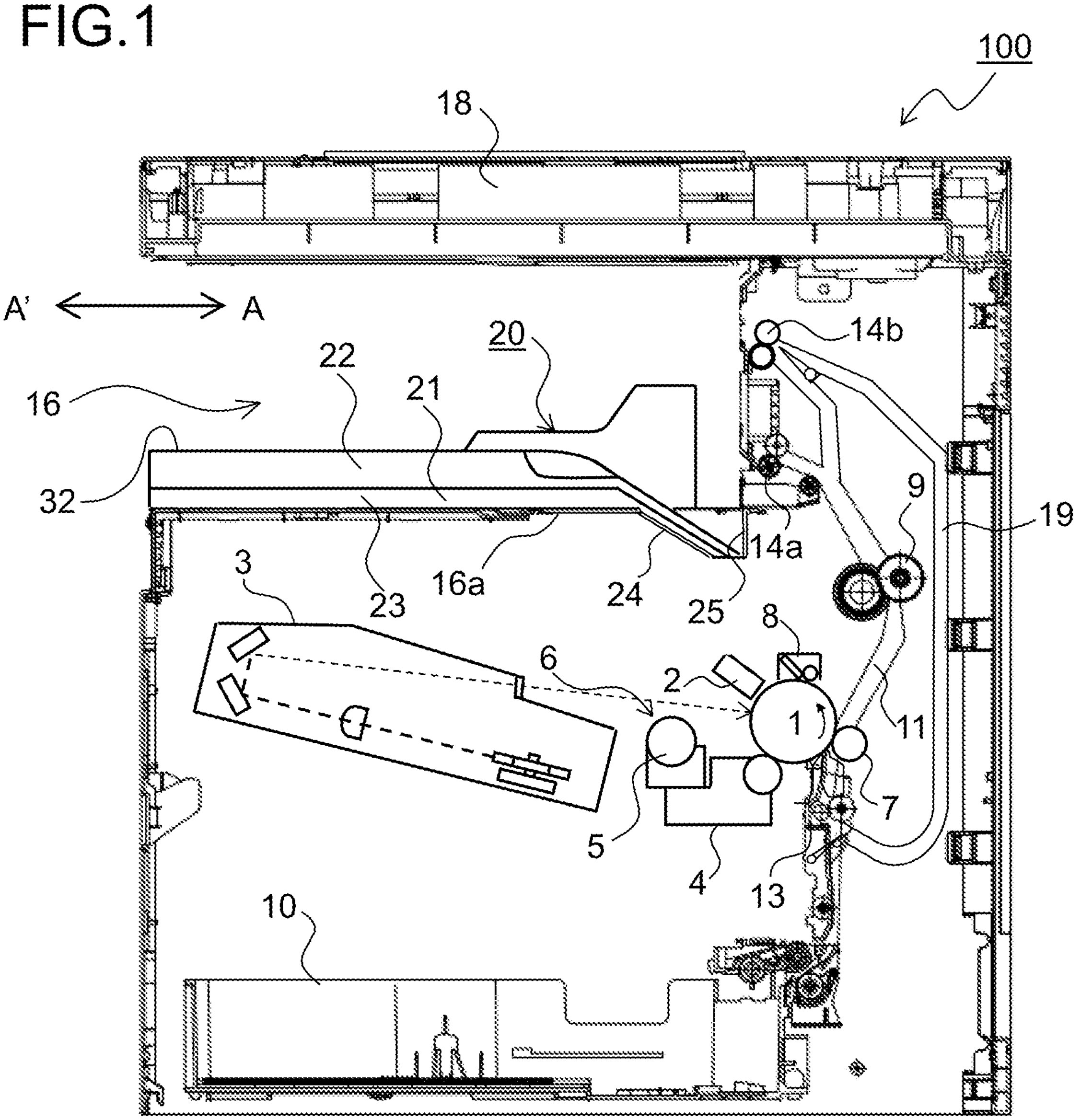
FIG. 1 is a diagram showing an outline of the internal construction of a sorting device according to the present disclosure and of an image forming apparatus mounted with the sorting device.
Figure 2:
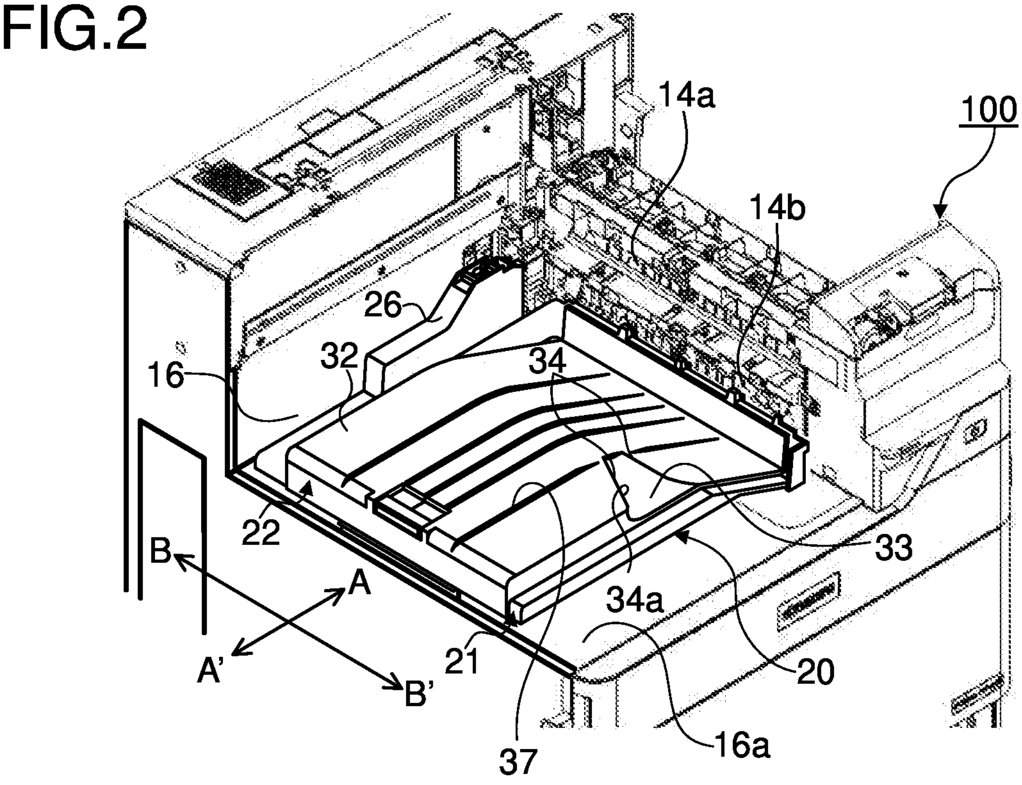
FIG. 2 is a perspective view showing the sorting device according to the present disclosure and the image forming apparatus mounted with it.

An embodiment of the present disclosure will be described below with reference to the accompanying drawings. FIG. 1 is a diagram showing an outline of the internal construction of a sorting device 20 according to the present disclosure and of an image forming apparatus 100 mounted with the sorting device 20. FIG. 2 is a perspective view showing the sorting device 20 according to the present disclosure and the image forming apparatus 100 mounted with it. While the embodiment deals with, as one example of the image forming apparatus 100, a digital multifunction peripheral, the sorting device 20 according to the present disclosure can be similarly coupled to any other types of image forming apparatuses such as laser printers, inkjet printers, and facsimile machines.

As shown in FIG. 1, inside the body of the image forming apparatus 100, an image forming portion 6 is arranged. The image forming portion 6 forms an image through the processes of electrostatic charging, exposure to light, image development, and image transfer.

In the image forming portion 6, along the rotation direction (counter-clockwise in FIG. 1) of a photosensitive drum 1, there are arranged a charging portion 2, an exposure unit 3, a developing device 4, a transfer roller 7, a cleaning device 8, and a destaticizing device (not illustrated).

The photosensitive drum 1 is, for example, a drum of aluminum that has a photosensitive layer deposited on it, and its surface is electrostatically charged uniformly by the charging portion 2.

The charging portion 2 electrically charges the surface of the photosensitive drum 1 uniformly. Usable as the charging portion 2 is, for example, a corona discharge device. Instead of a corona discharge device, use is also possible of a contact-type charging device The exposure unit 3 shines a light beam (e.g., a laser beam) on the photosensitive drum 1 based on document image data read in an image reading portion 18, and thereby forms an electrostatic latent image on the surface of the photosensitive drum 1.

The developing device 4 attaches toner to the electrostatic latent image on the photosensitive drum 1, and thereby forms a toner image. The developing device 4 is supplied with toner from a toner container 5.

The transfer roller 7 transfers the toner image formed on the surface of the photosensitive drum 1 to a sheet conveyed along a sheet conveyance passage 11. The cleaning device 8 includes a cleaning roller, a cleaning blade, or the like that makes line contact with the photosensitive drum 1 in its longitudinal direction. The cleaning device 8 removes residual toner that is left behind on the surface of the photosensitive drum 1 after the transfer of the toner image to the sheet.

The image reading portion 18 includes a scanning optical system, a condenser lens, a CCD sensor, and the like (of which none are illustrated).

Copying operation proceeds as follows. In the image reading portion 18, the image data of a document is read and is converted into an image signal. On the other hand, in the image forming portion 6, the charging portion 2 electrostatically charges uniformly the surface of the photosensitive drum 1. Next, based on the document image data read in the image reading portion 18, the exposure unit 3 shines a laser beam on the photosensitive drum 1. Thus an electrostatic latent image based on the image data is formed on the surface of the photosensitive drum 1. Then the developing device 4 attaches toner to the electrostatic latent image, and thereby forms a toner image.

From a sheet storage portion 10, a sheet is conveyed toward the image forming portion 6 with predetermined timing via the sheet conveyance passage 11 and a pair of registration rollers 13. The toner image formed on the surface of the photosensitive drum 1 in the image forming portion 6 is then transferred to the sheet by the transfer roller 7. The sheet having the toner image transferred to it is conveyed to a fixing portion 9, where the sheet is heated and pressed. Thus the toner image is fixed to the sheet.

The sheet having passed through the fixing portion 9 is conveyed through the sheet conveyance passage 11 to a pair of discharge rollers **14*a* or 14*b*. When an image is formed only on one side of the sheet, the sheet is conveyed by the pair of discharge rollers 14*a* to be discharged into the sorting device 20 mounted in an in-body discharge space 16**.

On the other hand, when images are formed on both sides of the sheet, the leading end of the sheet having passed through the fixing portion 9 is momentarily jutted out from the pair of discharge rollers **14*b* into the in-body discharge space 16. Next the pair of discharge rollers 14*b* is rotated reversely so that the sheet is switched back and guided into a reverse conveyance passage 19; thus the sheet is then conveyed, with the image side turned over, once again to the pair of registration rollers 13. Then the next image formed on the surface of the photosensitive drum 1 is transferred by the transfer roller 7 to the side of the sheet on which no image has been formed yet. Thereafter the sheet is conveyed to the fixing portion 9, where the toner image is fixed, and is then discharged by the pair of discharge rollers 14*a* into the sorting device 20**.

As shown in FIGS. 1 and 2, the sorting device 20 is removably mounted in a bottom portion **16*a* of the in-body discharge space 16. The sorting device 20 performs sorting whereby the sheets discharged from the pair of discharge rollers 14*a* are, in units of a predetermined number of sheets, moved alternately in the sheet width direction (the direction perpendicular to the plane of FIG. 1, the direction from arrow B to arrow B' in FIG. 2) orthogonal to the sheet discharge direction (the direction from arrow A to arrow A' in FIGS. 1 and 2). The sorting device 20 includes a base portion 21 and a tray portion 22**.

As shown in FIG. 1, the base portion 21 is attached to a bottom portion **16*a* of the in-body discharge space 16. The base portion 21 has a first flat portion 23, a first inclined portion 24, and a first upright wall portion 25. The first flat portion 23 extends in the sheet discharge direction along the bottom portion 16*a* of the in-body discharge space 16. The first inclined portion 24 extends from the first flat portion 23 upstream (in the arrow-A direction in the illustration) in the sheet discharge direction while inclining downward. The first upright wall portion 25 rises from an upstream end part of the first inclined portion 24 in the sheet discharge direction. Under the pair of discharge rollers 14*a*, an engaged portion (not illustrated) is provided. An engaging portion (not illustrated) that engages with the engaged portion is provided on the first upright wall portion 25. The engaging portion on the first upright wall portion 25 engages with the engaged portion in the image forming apparatus 100, and thereby the base portion 21 is attached in the in-body discharge space 16**.

As shown in FIGS. 1 and 2, the tray portion 22 is located over the base portion 21. The tray portion 22 is supported on the base portion 21 so as to be reciprocatable in the sheet width direction with respect to it. The tray portion 22 is movable between a first shift position SP1, which is the position farthest to one side (the front side of the image forming apparatus 100) within the range in which the tray portion 22 is movable in the sheet width direction, and a second shift position SP2, which is the position farthest to the other side (the rear side of the image forming apparatus 100) within the same range. The charging portion 2 has a sheet stacking surface 32. The tray portion 22 has, on its top surface, a sheet stacking surface 32. On the top surface of the sheet stacking surface 32, sheets P discharged from the pairs of discharge rollers **14*a* and 14*b*** are stacked.

In an end part of the base portion 21 at its far side in the sheet width direction (at the rear side of the image forming apparatus 100, i.e., in the arrow-B direction in the illustration), a connection portion 26 is provided upright. The connection portion 26 includes a connector (not illustrated). To the connector are connected cables for feeding electric power and control signals to the sorting device 20. Between the base portion 21 and the tray portion 22, there is arranged a driving mechanism (not illustrated) including a motor and gears for reciprocating the tray portion 22.

Figure 3A:
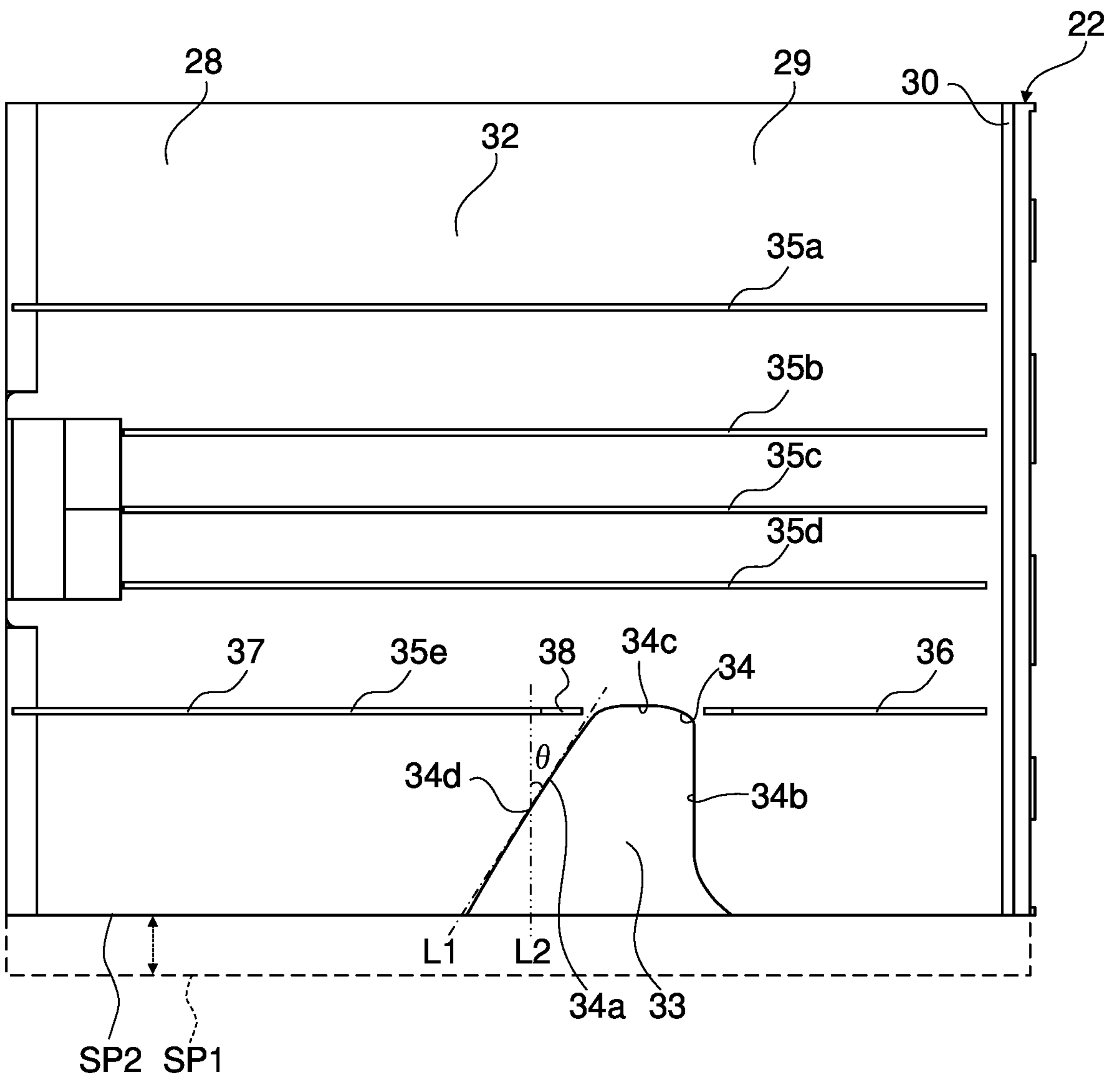
FIG. 3A is a plan view of a tray portion as seen from the sheet stacking direction.
Figure 3B:
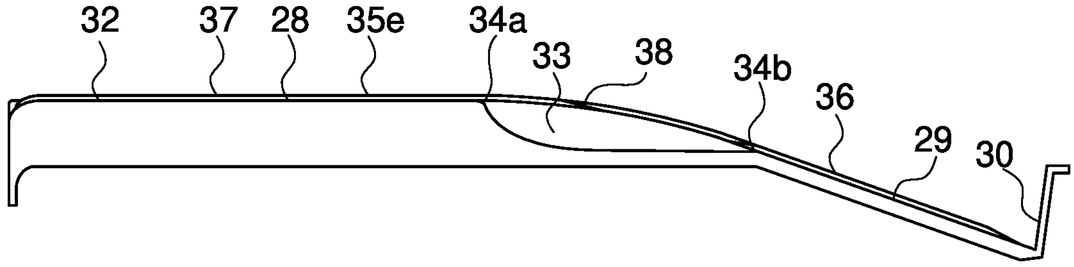
FIG. 3B is a side view of the tray portion as seen in a plan view from the sheet width direction.
Figure 4:
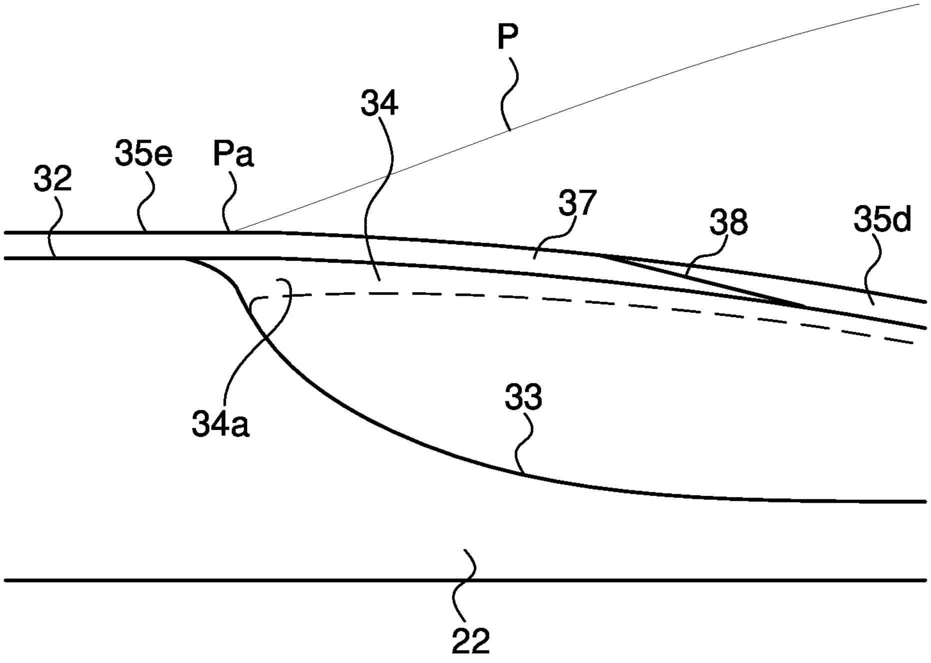
FIG. 4 is an enlarged part view showing details around a cutout portion shown in FIG. 3B.

Next, with reference to FIGS. 3A, 3B, and 4, the tray portion 22 will be described in detail. FIG. 3A is a plan view of the tray portion 22 as seen from the sheet stacking direction. FIG. 3B is a side view of the tray portion 22 as seen in a plan view from the sheet width direction. FIG. 4 is an enlarged part view showing details around a cutout portion 33 shown in FIG. 3B.

As shown in FIGS. 3A and 3B, the tray portion 22 has a second flat portion 28, a second inclined portion 29, and a second upright wall portion 30. The second flat portion 28 extends in the sheet discharge direction. The second inclined portion 29 extends from the second flat portion 28 upstream in the sheet discharge direction while inclining downward. The second upright wall portion 30 rises from an upstream end part of the second inclined portion 29 in the sheet discharge direction.

The second inclined portion 29 is located so as to overlap at least part of the sheets P discharged from the pairs of discharge rollers **14*a* and 14*b*. Thus the discharged sheets P slide down along the second inclined portion 29 of the tray portion 22. The second upright wall portion 30** makes contact with and thereby aligns the trailing ends of the sheets P that have slid down.

In an end part of the tray portion 22 at one side in the sheet width direction, that is, in an end part of the tray portion 22 at the front side of the in-body discharge space 16, a cutout portion 33 is formed. The cutout portion 33 has the shape of a recess depressed from the sheet stacking surface 32 toward the bottom portion 16*a* of the in-body discharge space 16. The cutout portion 33 has a tapered shape that extends inward across the tray portion 22 in the sheet width direction while becoming increasingly narrow. That is the width of the cutout portion 33 in the sheet width direction decreases from its end at one side in the sheet width direction inward across the tray portion 22 in the sheet width direction.

The cutout portion 33 has an edge portion 34 that defines the boundary between the sheet stacking surface 32 and the inner surface of the cutout portion 33. The edge portion 34 has the shape of a round surface that connects between the sheet stacking surface 32 and the inner surface of the cutout portion 33 with an arch-shaped curve (see FIG. 4).

The edge portion 34 has a downstream edge portion 34*a*, an upstream edge portion 34*b*, and a far edge portion 34*c*. The downstream edge portion 34*a* forms a downstream part of the edge portion 34 in the sheet discharge direction, and the upstream edge portion 34*b* forms an upstream part of the edge portion 34 in the same direction. The far edge portion 34*c* connects together the upstream and downstream edge portions 34*b* and 34*a* along the sheet discharge direction. The downstream edge portion 34*a* extends from an end part of the tray portion 22 in the sheet width direction inward in the sheet width direction, that is, inward across the sheet stacking surface 32 while inclining so as to be increasingly upstream in the sheet discharge direction.

In a plan view in the stacking direction of sheets P (in the direction into the plane of FIG. 3A), the downstream edge portion 34*a* has the shape of an arch-shaped curve that slightly bulges outward of the cutout portion 33. The tangent line L1 (dash-and-dot line in FIG. 3A) drawn on the downstream edge portion 34*a* at the middle 34*b* of it in the sheet width direction and the imaginary straight line L2 (dash-dot-dot line in FIG. 3A) drawn to extend in the sheet width direction through the middle 34*b* form between them an inclination angle θ. The inclination angle θ is preferably in the range of $10° < \theta < 40°$, and more preferably in the range of $20° \leq \theta \leq 30°$.

On the sheet stacking surface 32, a plurality of ribs 35*a* to 35*e* are formed. The ribs 35*a* to 35*e* project from the sheet stacking surface 32 in the height direction and extend along the sheet discharge direction. The ribs 35*a* to 35*e* are arrayed at predetermined intervals in the sheet width direction.

Of the ribs 35*a* to 35*e*, the rib 35*e* located farthest to one side in the sheet width direction is divided into two parts with the cutout portion 33 in between in the sheet discharge direction. Of the two parts of the rib 35*e*, the one located upstream in the sheet discharge direction is referred to as the upstream rib 36, and the one located downstream in the sheet discharge direction is referred to as the downstream rib 37. The upstream and downstream ribs 36 and 37 are arrayed on a straight line along the sheet discharge direction. That is, on an extension line of the upstream rib 36 extending downstream of it in the sheet discharge direction, the downstream rib 37 is located.

As shown in FIG. 4, in an upstream end part of the downstream rib 37 in the sheet discharge direction, a third inclined part 38 is formed that extends upstream in the sheet discharge direction while inclining so as to be increasingly downward. The third inclined part 38 is located upstream, in the sheet discharge direction, of the middle 34*b* of the downstream edge portion 34*a* in the sheet discharge direction.

Here, the sheet storage portion 10 of the image forming apparatus 100 can accommodate sheets of varying sizes. Of such sheets of varying sizes, those with the maximum dimension in the width direction can be, for example, sheets of A4 size (210 mm×97 mm). To follow is a detailed description of, among others, the positional relationship between the discharge position of sheets P and the relevant parts of the tray portion 22 as observed during discharge of sheets P with the maximum dimension in the width direction in the landscape orientation (the orientation with the longer sides of the sheets P aligned along the sheet width direction).

A sheet P discharged from the image forming apparatus 100 is stacked on the sheet stacking surface 32. Meanwhile, as shown in FIG. 4, the downstream leading end Pa of the sheet P in the sheet discharge direction moves in the sheet discharge direction while in contact with the top end surfaces of the ribs 35*a* to 35*e*. Thus, between the sheet stacking surface 32 and the sheets P, a predetermined gap is left in the height direction.

The part of the leading end Pa of the sheet P in contact with the rib 35*e* farthest to one side in the sheet width direction, when it makes contact with the third inclined part 38, runs on a projecting end part of the downstream rib 37 so as to move along the third inclined part 38 away from the sheet stacking surface 32 and the downstream edge portion 34*a* of the cutout portion 33.

Sorting by the sorting device 20 proceeds as follows. For example, with the tray portion 22 arranged at one side (in the arrow-B' direction) of the base portion 21 in the sheet width direction, sheets P are discharged from the pair of discharge rollers 14*a* (or from the pair of discharge rollers 14*b*) onto the tray portion 22. When a predetermined number of sheets P have been discharged, the tray portion 22 is moved to the other side in the sheet width direction (in the arrow-B direction) and a predetermined number of sheets are discharged. When the predetermined number of sheets P have been discharged, the tray portion 22 is moved back to one side in the sheet width direction (in the arrow-B' direction). Such operation is repeated, so that bundles of sheets are stacked in units of a predetermined number of sheets on the tray portion 22.

Figure 5:
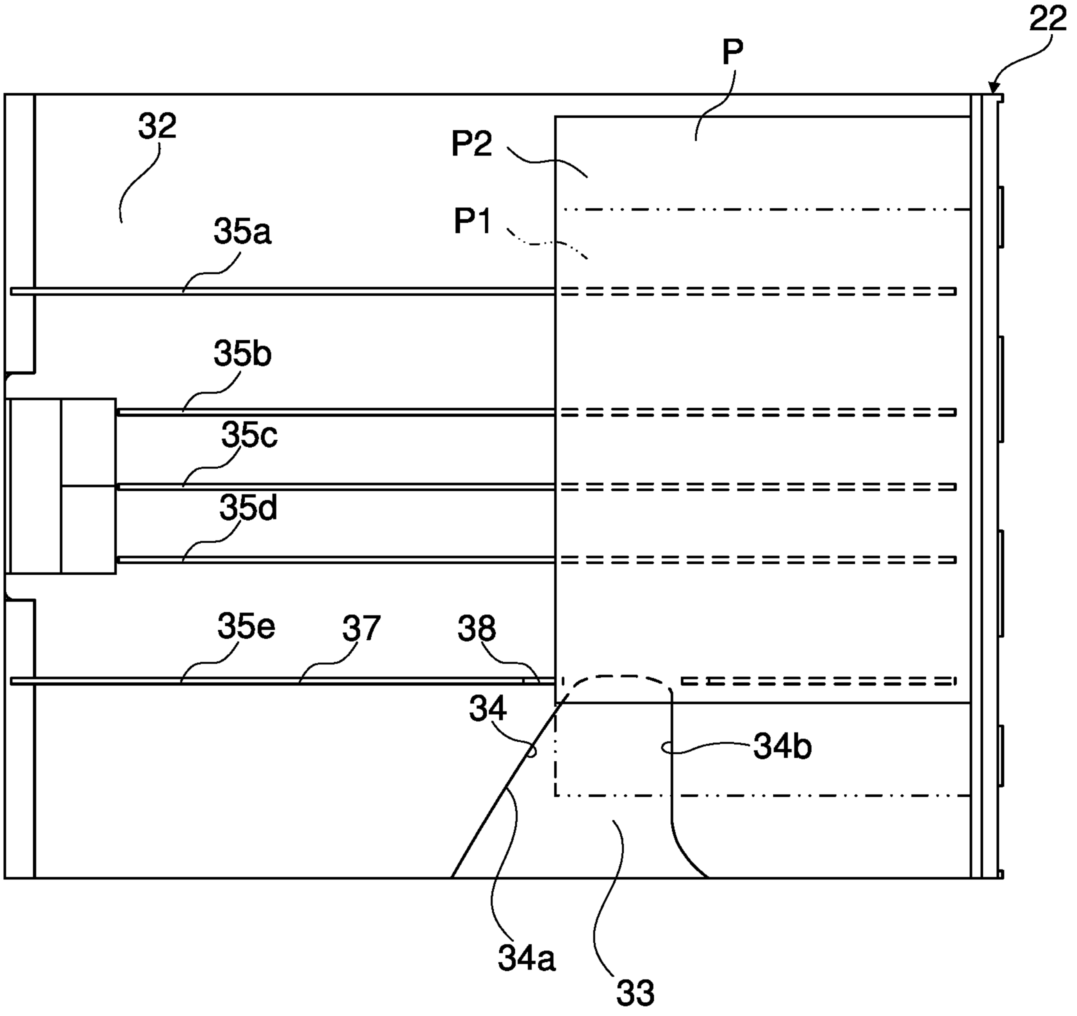
FIG. 5 is a plan view of the tray with sheets stacked on it as seen from above.

FIG. 5 is a plan view of the tray portion 22 with sheets P stacked on it as seen from above. In FIG. 5, the discharge position P1 where sheets P are discharged when the tray portion 22 is located farthest to the other side in the sheet width direction (i.e., when it is located in the second shift position SP2) is indicated by dash-dot-dot lines, and the discharge position P2 where sheets P are discharged when the tray portion 22 is located farthest to one side in the sheet width direction (i.e., when it is located in the first shift position SP1) is indicated by solid lines.

When the tray portion 22 is located in the first shift position SP1, sheets P are discharged so as to overlap the cutout portion 33. In this case, side end parts of the sheets P at one side in the sheet width direction overlap the cutout portion 33. Here, the position at which the sheets P are stacked is father from the cutout portion 33 in the sheet width direction when the tray portion 22 is located in the first shift position SP1 than when the tray portion 22 is located in the second shift position SP2. Accordingly, the cutout portion 33 is arranged such that, when sheets P are discharged in the landscape orientation (i.e., with the long sides of sheets aligned along the sheet width direction), regardless of the position of the tray portion 22 in the sheet width direction, the cutout portion 33 overlaps the discharge position of sheets P.

Thus, with the sorting device 20, regardless of the position of the tray portion 22 in the sheet width direction, the user can, by putting a hand in the cutout portion 33, grab a bundle of sheets P with the maximum dimension in the sheet width direction that was discharged from the image forming apparatus 100.

Moreover, as mentioned above, a gap is left between the sheets P discharged from the image forming apparatus 100 and the sheet stacking surface 32. The gap makes the sheets P less susceptible to the friction and the like that they suffer against the sheet stacking surface 32. Thus the sorting device 20 prevents untidy sorting of sheets P and permits easy retrieval of bundles of sheets P on the tray portion 22.

Moreover, as mentioned above, in an upstream end part of the downstream rib 37 in the sheet discharge direction, the third inclined part 38 is provided. When a sheet P makes contact with the upstream end part of the downstream rib 37, it runs on the top end surface of the downstream rib 37 along the third inclined part 38, and this makes the sheet P being discharged less likely to be caught on the downstream rib 37. Thus the sorting device 20 suppresses untidy sorting of sheets P and permits easy retrieval of bundles of sheets P on the tray portion 22 easily.

Moreover, as mentioned above, the downstream edge portion 34*a* extends inward across the sheet stacking surface 32 while inclining so as to be increasingly upstream in the sheet discharge direction. Thus, even when the leading end Pa of a sheet P discharged from the image forming apparatus 100 makes contact with the downstream edge portion 34*a*, the downstream edge portion 34*a* is less prone to resist the discharge of the sheet P, and the leading end Pa of the sheet P moves along the inclination downstream in the sheet discharge direction. That is, when the sheet P is discharged, it is prevented from being misaligned. Thus it is possible to prevent untidy sorting of sheets P resulting from their being caught on the downstream edge portion 34*a*, and to permit easy retrieval of bundles of sheets on the tray portion 22.

Moreover, as mentioned above, the third inclined part 38 is located upstream of the middle of the downstream edge portion 34*a* in the sheet discharge direction. Thus the position at which the leading end Pa of a sheet P makes contact with the third inclined part 38 is located upstream of the middle of the downstream edge portion 34*a* in the sheet discharge direction. That is, the position at which the leading end Pa of the sheet P moves away from the cutout portion 33 is located upstream of the middle of the downstream edge portion 34*a* in the sheet discharge direction. This makes the leading end Pa of the sheet P less likely to make contact with the downstream edge portion 34*a*. In this way, of the ribs 35*a* to 35*e*, the rib 35*e* located farthest to one side in the sheet width direction keeps the sheet P discharged from the image forming apparatus 100 away from the downstream edge portion 34*a* of the cutout portion 33. Thus the sorting device 20 prevents untidy sorting of sheets P and permits easy retrieval of the sheets P on the tray portion 22.

The present disclosure is not limited by the embodiments described above and allows for any modifications without departure from its spirit. For example, the downstream edge portion 34*a* does not need to have the shape of an arch-shaped curve: it may instead be so configured as to be composed of a straight part formed in the middle of the downstream edge portion 34*a* in the sheet width direction and curved parts formed one on each end of the straight part. In that case, the inclination angle θ is formed between the straight part and the imaginary straight line drawn along the sheet width direction. The downstream edge portion 34*a* may instead be configured to describe a straight line extending from a side end part of the tray portion 22 at one side in the sheet width direction inward in the sheet width direction. Also in that case, the inclination angle θ is formed between the straight part and the imaginary straight line drawn along the sheet width direction.

EXAMPLES

The effects of the present disclosure will now be described in further detail by way of examples.

Verification experiments were performed to study, with respect to sheets P discharged from the image forming apparatus 100 using the sorting device 20 according to the present disclosure, the misalignment of the sheets P observed when they made contact with the downstream edge portion 34*a*. Used as the test machine was an image forming apparatus 100, like the one shown in FIG. 1, that incorporated a sorting device 20 provided with a cutout portion 33. While the inclination angle θ of the downstream edge portion 34*a* of the cutout portion 33 was changed from 0° to 30° in 10° steps, the misalignment of sheets P was compared among the different angles.

Plain-paper sheets P of A4 size (210 mm×97 mm) were used, with the sheets P discharged in the landscape orientation (the orientation with the longer sides of sheets P aligned along the sheet width direction). The leading end Pa of a sheet P is the longer side of it located downstream in the sheet discharge direction.

On the sorting device 20 of Comparative Example 1, the inclination angle θ of the downstream edge portion 34*a* was set at 0° (such that the downstream edge portion 34*a* is perpendicular to the sheet discharge direction); in Comparative Example 2, the inclination angle θ was set at 10°. In Practical Example 1 according to the present disclosure, the inclination angle θ was set at 20°, and in Practical Example 2 according to the present disclosure, the inclination angle θ was set at 30°. Thus the inclination angle θ was set to vary in 10° steps from Comparative Example 1 to Practical Example 2.

Evaluation was done as follows. When a sheet P in the middle of being discharged moved downward in the sheet discharge direction with the leading end Pa of the sheet P in contact with the downstream edge portion 34*a*, if the sheet P deformed (if the sheet P became misaligned), this was evaluated as "NG"; if the sheet did not deform (if it did not become misaligned), this was evaluated as "OK". The results are shown in Table 1.

TABLE 1

| | Alignment of Sheets P |
|---|---|
| Comparative Example 1 (θ = 0°) | NG |
| Comparative Example 2 (θ = 10°) | NG |
| Practical Example 1 (θ = 20°) | OK |
| Practical Example 2 (θ = 30°) | OK |

As shown in Table 1, in Comparative Examples 1 and 2, misalignment of sheets P was observed. By contrast, in Practical Examples 1 and 2, no misalignment of sheets P was observed. From the observation it is seen that, with the inclination angle θ larger than 10°, even when the leading end Pa of a sheet P discharged from the image forming apparatus 100 makes contact with the downstream edge portion 34*a* of the cutout portion 33, the sheet P can be prevented from being misaligned. It is thus understood that the inclination angle θ of the downstream edge portion 34*a* should preferably be larger than 10° to suppress misalignment of sheets P during their discharge and to allow the user easy retrieval of bundles of sheets P on the tray portion 22.

The present disclosure finds application in sorting devices that are mounted in an in-body discharge space in image forming apparatuses. Based on the present disclosure, it is possible to provide a sorting device that allows the user easy retrieval of sheets with the maximum dimension in the sheet width direction that are stacked on a tray portion.

What is claimed is:

1. A sorting device provided in a sheet discharge space in an apparatus body, the sorting device shifting a stacking position of discharged sheets in a sheet width direction orthogonal to a sheet discharge direction, thereby to sort the sheets, the sorting device comprising:
- a base portion attached to a bottom portion of the sheet discharge space in the apparatus body;
- a tray portion supported on the base portion so as to be reciprocatable between a first shift position in which the tray portion is located at one side in the sheet width direction and a second shift position in which the tray portion is located at the other side in the sheet width direction, the tray portion on which the sheets discharged from the apparatus body are stacked at the first shift position and the second shift position, wherein the sheets on the tray portion can be retrieved from the one side in the sheet width direction, the tray portion has:
- a tray-side inclined portion arranged upstream of a middle of the tray portion with respect to the sheet discharge direction and extending downstream while inclining upward;
- a flat portion arranged downstream of the tray-side inclined portion; and
- a cutout portion formed by cutting out, with a predetermined width, a one side end part of the tray portion at the one side in the sheet width direction inward the tray portion, and the cutout portion has:
- a downstream edge portion which is located downstream in the sheet discharge direction, and
- an upstream edge portion which is located upstream, in the sheet discharge direction, of a middle of the downstream edge portion with respect to the sheet width direction and which faces the downstream edge portion in the sheet discharge direction, the upstream edge portion is located on the tray-side inclined portion and a part of the downstream edge portion at the one side is located on the flat portion, the downstream edge portion extends, from the one side end part of the tray portion, inward across the tray portion while inclining upstream in the sheet discharge direction, the tray portion has on a top surface thereof a plurality of ribs that extend along the sheet discharge direction and that are arranged at predetermined intervals in the sheet width direction, of the plurality of ribs, a front rib located at a position overlapping the cutout portion in the sheet width direction is divided, with the cutout portion in between, into an upstream rib, which is located upstream in the sheet discharge direction, and a downstream rib, which is located downstream in the sheet discharge direction, the upstream and downstream ribs are arranged on a straight line along the sheet discharge direction, in an upstream end part of the downstream rib in the sheet discharge direction, a rib-side inclined portion is formed that extends upstream in the sheet discharge direction while inclining so as to be increasingly close to the top surface of the tray portion on which the sheets are stacked, and the rib-side inclined portion is located upstream, in the sheet discharge direction, of the middle, and an inclination angle a between a tangent line drawn on the downstream edge portion at the middle thereof in the sheet width direction and an imaginary straight line drawn to extend in the sheet width direction through the middle is larger than 10° but smaller than 40°.

2. The sorting device according to claim 1, wherein the front rib is, of the plurality of ribs, a rib located farthest to the one side in the sheet width direction.

3. The sorting device according to claim 1, wherein the cutout portion further includes a deep side edge portion that extends along the sheet discharge direction and connects the downstream and the upstream edge portion, and the front rib is divided into the upstream and downstream ribs with the far edge portion in between.

4. The sorting device according to claim 1, wherein of the plurality of ribs, the front rib located farthest to the one side in the sheet width direction guides the sheets such that an downstream end part of the sheets in the sheet discharge direction passes over the downstream edge portion.

5. The sorting device according to claim 1, wherein the cutout portion has a recessed shape depressed from a top surface of the tray portion toward the bottom portion, and the cutout portion has a downstream edge portion which is located downstream in the sheet discharge direction, the downstream edge portion has a curve surface that connects together the top surface of the tray portion and an inner surface of the cutout portion.

6. An image forming apparatus, comprising:

an apparatus body including:
- an image forming portion which forms images on sheets; and
- a sheet discharge space into which the sheets are discharged; and the sorting device according to claim 1.

* * * * *